United States Patent [19]

[11] Patent Number: 4,654,637

[45] Date of Patent: Mar. 31, 1987

Schantz

[54] BUZZER WITH ADJUSTABLE VOLUME LEVEL

[76] Inventor: Spencer C. Schantz, 5880 Anchorage Rd., Oconomowoc, Wis. 53066

[21] Appl. No.: 394,354

[22] Filed: Jul. 1, 1982

[51] Int. Cl.[4] .......... G01K 1/08

[52] U.S. Cl. .......... 340/402; 340/384 R

[58] Field of Search .......... 340/384 E, 384 R, 396, 340/397, 400, 402, 404

[56] References Cited

U.S. PATENT DOCUMENTS

| | | | |
|---|---|---|---|
| 2,757,365 | 7/1956 | Perez | 340/402 |
| 3,518,667 | 6/1970 | Hanna | 340/384 R |
| 3,522,601 | 8/1970 | Dolter | 340/400 |
| 3,533,103 | 10/1970 | Hayden | 340/402 |
| 3,537,104 | 10/1970 | Dolter | 340/402 |
| 3,618,421 | 11/1971 | Pecak | 340/402 |
| 3,927,403 | 12/1975 | Schantz | 340/402 X |
| 4,005,413 | 1/1977 | Berns | 340/402 |
| 4,054,870 | 10/1977 | Barber | 340/402 |
| 4,115,770 | 9/1978 | Kanazawa | 340/396 |
| 4,163,223 | 7/1979 | Sato | 340/384 R |
| 4,212,001 | 7/1980 | Taira | 340/384 R |
| 4,398,182 | 8/1983 | Hibell | 340/402 |
| 4,413,253 | 11/1983 | Hofer | 340/384 R |

*Primary Examiner*—John W. Caldwell, Sr.
*Assistant Examiner*—Tyrone Queen
*Attorney, Agent, or Firm*—Fuller, Puerner & Hohenfeldt

[57] ABSTRACT

A compact electrical buzzer is provided with an adjustment cap which is threadably positioned from the end of the bobbin sleeve which contains the buzzer plunger. The cap has a peripheral skirt which frictionally engages the buzzer housing. The mounting bracket is provided with a saddle-shaped rib on the lower mounting surface which, together with a spaced protrusion, provides a three point mounting on the supporting surface.

18 Claims, 10 Drawing Figures

BUZZER WITH ADJUSTABLE VOLUME LEVEL

BACKGROUND OF THE INVENTION

The present invention is a further development of the subject matter of my U.S. Pat. No. 3,927,403. The present invention relates to compact electrical buzzers which can be contained within the housing or casing of interoffice communication equipment such as intercoms, business telephone systems or the like. Although the buzzer set forth in the above-mentioned patent is effective to accomplish the desired results, various improvements disclosed herein improve mechanical coupling to the mounting surface on the telephone chassis or frame to minimize loss of sound energy. The present invention also strenghthens the bracket configuration over that shown in the prior art and provides volume adjustment capability.

SUMMARY OF THE INVENTION

The improved mounting bracket for a buzzer includes a mounting ear having an increased area and a rib for strength. A saddle-shaped protrusion on the undersurface of the bracket provides two mounting contact points. A tapered protrusion at the end of the mounting bracket cooperates to provide a third point for solid mounting. The mounting screw slot is also shaped to facilitate positive positioning of the mounting screw.

In a modified embodiment, a U-shaped screw slot in the mounting bracket is provided with cam ramps which facilitate assembly and provide a snap fit of the mounting screw.

Other features of the invention relate to an extruded neck on the magnetic case or housing to enhance magnetic coupling between the case and the plunger.

An important aspect of the invention relates to the provision of a buzzer volume adjustment member which has a diameter desirably as large or larger than the diameter of the cylindrical buzzer housing to afford side access or tangential torquing or adjustment by finger, pencil eraser or tool through the frontal plate of the telephone slot. In one embodiment, the buzzer plunger is exposed through an open end of the bobbin sleeve to afford contact with the adjustment wheel or stop which limits travel of the plunger during oscillation to a selected amount to adjust the volume of the buzzer. The adjustment wheel is threadably received on a bobbin sleeve portion. The wheel has a spherical abutment which engages the end of the plunger. Various friction arrangements can be employed to retain the cap against undesired rotation caused by vibration.

Further objects, features and advantages of the invention will become apparent from the disclosure.

DESCRIPTION OF THE PREFERRED EMBODIMENT

Figure 1:
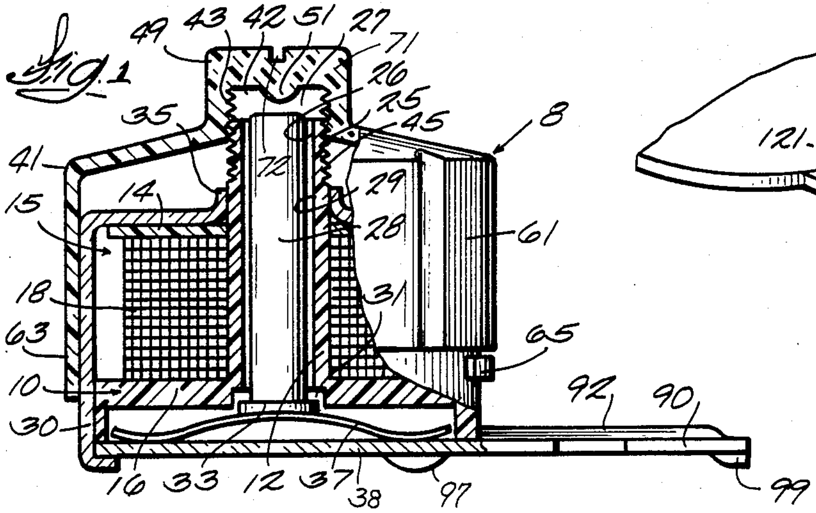
FIG. 1 is a side elevational view in fragmentary section of a buzzer in accordance with the invention.

FIG. 1 shows an adjustable buzzer 8 in accordance with the invention which includes a bobbin 10 having a central sleeve portion 12 with two annular flanges 14 and 16 which are formed integrally with the sleeve portion 12 and which define the coil compartment 15 for a coil 18. The coil is provided with terminals, not shown, for connection to an electrical circuit. The upper end 25 of the sleeve 12 projects beyond the flange 14 and beyond coil 18 and is open at 26 to enable access to the end 27 of the plunger 28 which is made of magnetic material and is slideably received within the interior 29 of the sleeve. The flange 16 has a recess 31 for receiving the head 33 of the plunger which retains the plunger in the sleeve portion 12. A leaf spring 37 (FIG. 1) urges the plunger 28 upwardly.

The coil 18 and bobbin 10 are confined within a magnetic metal housing or case 30 having an extruded neck portion 35 (FIG. 1) which extends therefrom and provides additional metal around the plunger to improve magnetic coupling between the plunger 28 and the housing 30.

The buzzer as thus far described operates in the usual manner and in accordance with the disclosure in col. 2, lines 39–45 of U.S. Pat. No. 3,927,403.

When the coil 18 is energized by alternating current, plunger 28 vibrates axially within the sleeve 12 moving the spring 37 and causing the spring to strike the mounting bracket 38, and then moving upwardly again in each half cycle of the alternating current as the magnetic field builds up to a maximum and then drops to zero, thereby producing a buzzing sound.

To control the travel of the plunger 28 during oscillation and provide the volume or sound intensity desired, the buzzer is provided with a plastic molded adjustment cap 41 which has a bore 42 with internal threads 43. The cap 41 can function as an adjustable stop to change the travel of the plunger and hence the volume of the buzzer. Maximum volume is obtained when the maximum or unrestricted plunger travel is afforded. The cap 41 has an external knurled surface to facilitate manipulation. The threads 43 are threadably received by external threads 45 on the bobbin sleeve portion 25. The adjustment cap 41 has an end wall 49 with a semispherical knob 51 which provides a central impact area which engages the plunger 28. The central impact area is shaped to provide small point contact to minimize a tumbling component on the plunger which could occur if there was no consistent impact point, which thus could cause wear of the plunger.

To prevent stripping of the threads 43, 45 when the adjustment cap 41 is tightened to the end of threaded travel, the sleeve is formed with a thin wall and oppositely located flats 55. When the torque gets sufficiently high at the end of threaded travel, the thin wall of the sleeve deflects inwardly caused by cam action of the threads 43, 45. Deflection of the sleeve wall causes the threads to jump and re-engage and afford rotation. Fine threads 43, 45 are desirable to facilitate the thread skipping or jumping.

The adjustment cap 41 can also have a castellated skirt to provide depending fingers 61 which frictionally grip the outside surface of the housing 30 and prevent vibrational rotation which could change the volume from the volume selected. Typically, a one-third turn provides the full range of volume adjustment. Accordingly, a finger 63 can be longer than the other fingers to engage an optional stop 65 on the housing to limit rotation of the cap 31 to less than 360°.

Alternatively, adjustment friction for the cap 41 can be provided by having either or both threaded portions 43 and 45 out of round.

Figure 4:
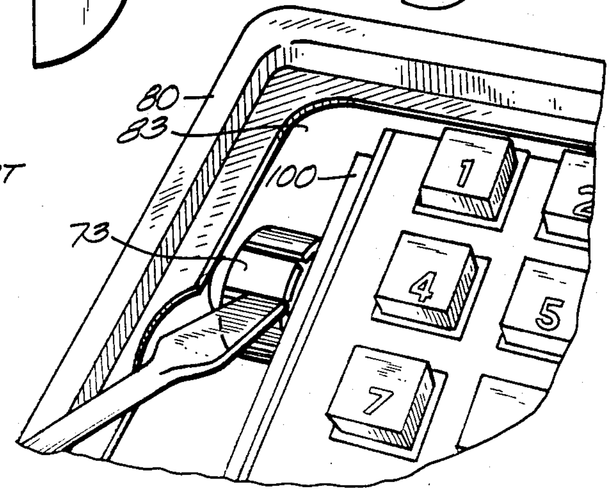
FIG. 4 is a fragmentary perspective view of a buzzer in accordance with the invention assembled in a telephone housing.

The protruding end wall 71 is provided with a screw driver or coin slot 72 for manipulation of the adjustment member and to facilitate assembly. Gaps 73 between the fingers also enable screw driver torquing of the cap 41 which, as shown in FIG. 4, enables rotation of the cap without removing the outer case 80 of a telephone by inserting the screw driver blade in frontal access opening 83 of the telephone housing through which the buttons are exposed.

Figure 2:
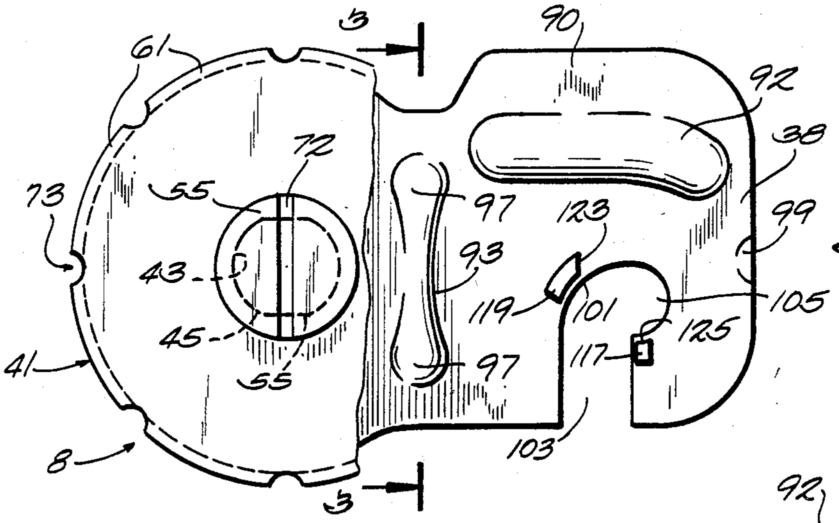
FIG. 2 is a plan view with parts broken away of the buzzer illustrated in FIG. 1.
Figure 3:
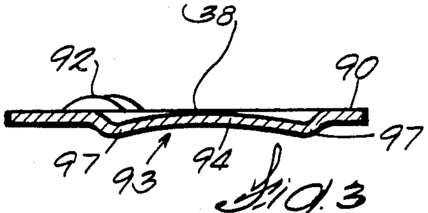
FIG. 3 is a sectional view along line 3—3 of FIG. 2.
Figure 5:
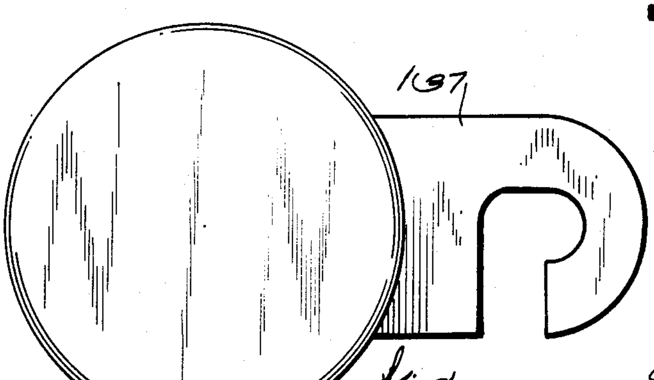
Fig. 5 PRIOR ART
FIG. 5 is a view of a prior art bracket.

Referring to FIG. 2, the magnetic mounting bracket 38 for the buzzer 8 is different from the prior art mounting bracket 137 illustrated in FIG. 5 in several respects to increase strength, facilitate mounting and provide a more positive mechanical coupling to the mounting surface 100 in the telephone. The increased strength is accomplished by widening the metal to provide a fin 90 and adding a dog-leg-shaped rib 92.

A three point contact of the bracket 38 with the supporting surface on the telephone chassis 100 is provided by a mounting projection 93 on the underface of the bracket 38 in the form of a saddle-shaped rib which has a central low point at 94 and two high portions or peaks 97 which, together with the tapered protrusion 99, provide a stable three point contact on the mounting plate 100, which affords good mechanical coupling with the phone chassis. The gradual slope from the peaks 97 to the low point or valley 94 insures a three point contact with the mounting plate 100 even though a peak 97 is offset from surface 100 or is over an opening therein.

The screw mounting slot 103 has a compound large radius at 101 which facilitate positive location of a mounting screw in the loop portion 105. It also leaves more metal for bracket strength.

Figure 6:
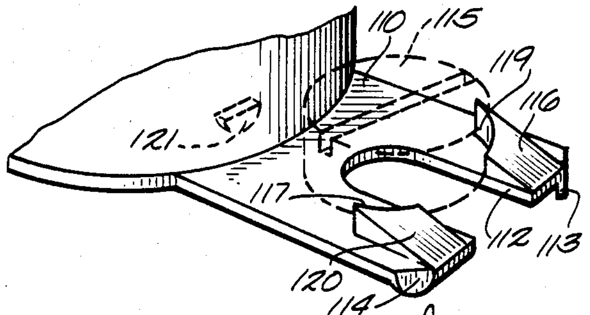
FIG. 6 is a modified embodiment of the mounting bracket of the invention.

FIG. 6 illustrates a modified embodiment of the mounting bracket 110 with a U-shaped slot 112 which is open to the end rather than the side of the bracket 110. Ramps 116 and 120 are provided with screw head conforming areas 117 and 119 and the camming action of the ramps when sliding the bracket into place provides a snap fit onto the head 115 of the loosened mounting screw. Turned down or bent corners 113, 114 slightly raise the mounting bracket 110 above the mounting surface and together with projection 121 provide a three point mounting. The elastic deformation of the mounting bracket 110 between the suspension points provides a lock washer effect on the mounting screw to prevent inadvertent loosening due to vibration.

The bracket 38 in FIG. 2 can also be provided with lugs or ramps 117, 119 with curved end portions 123, 125 which are complementary to the radius of the screw head. The lugs 117, 119 are positioned relative to the slot 103 to position the screw in the slot corner.

Figure 7:
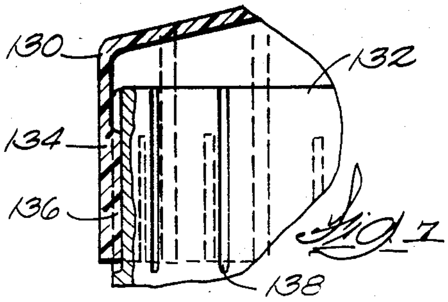
FIG. 7 is a sectional view of a modified embodiment of an adjustment cap and casing in accordance with the invention.

FIG. 7 shows a modified embodiment of an adjustment cap 130 and metal case or housing 132. The fingers 134 have ribs 136 which coact with detents or recesses 138 on the cap 130 to provide adjustment retention.

Figure 8:
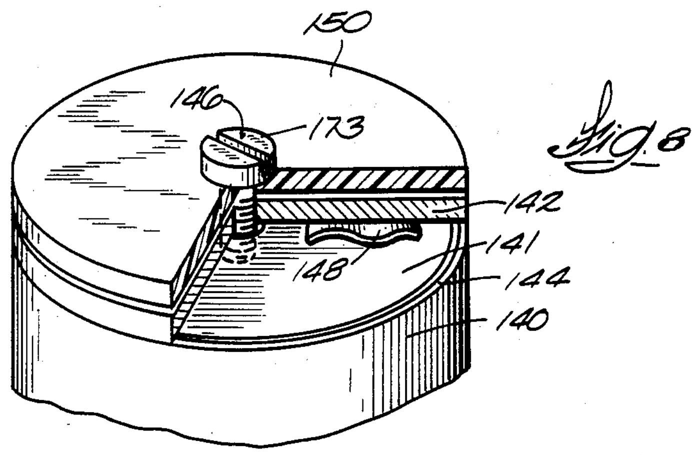
FIG. 8 is a perspective view with parts in section of a modified embodiment of the invention.

FIG. 8 shows a modified embodiment of a buzzer in which the housing 140 encloses a coil 141 which has an armature plate 142 which spans the upper rim 144 of the housing and is loosely supported against the rim to afford vibration by a screw 146 and a spring 148. As thus far described, the buzzer is conventional. In accordance with the invention, a plastic volume adjustment wheel 150 is provided. The wheel 150 is threadably received on screw 146. Threaded movement against and away from the armature plate 142 changes the character of the vibration of plate 142 and hence the volume of the buzzer. The wheel 150 is tangentially accessible and manipulatable for torquing with a tool or coin through access opening 83 as illustrated in FIG. 4. With a thin wheel a diameter at least as large as the housing is preferred.

Figure 9:
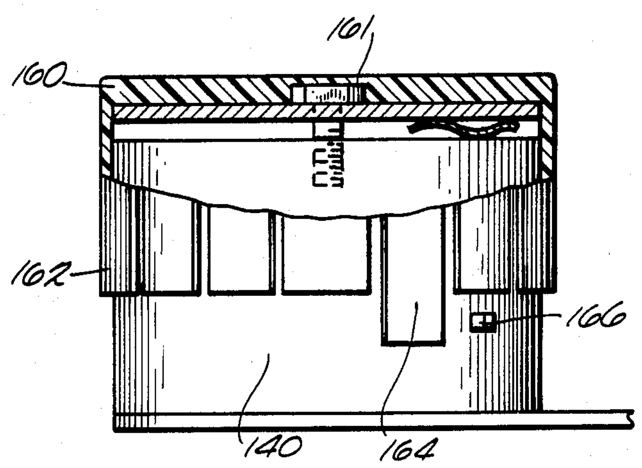
FIG. 9 is an elevational view in fragmentary section of a modified embodiment.

The buzzer illustrated in FIG. 9 has a buzzer control wheel 160 with depending fingers 162 similar to the cap in FIG. 1, with one finger 164 having a length greater than the others to cooperate with a stop 166 on the housing wall of housing 140. The fingers 164, 162 frictionally grip the housing to provide adjustment friction and retention. In the FIG. 9 embodiment, the wheel 160 is fixed to the screw head 161.

Figure 10:
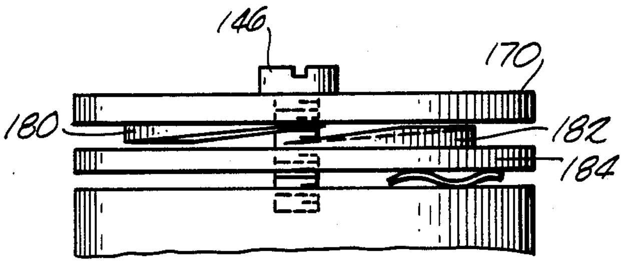
FIG. 10 is an elevational view of a further modified embodiment.

FIG. 10 shows a further embodiment similar to FIG. 8 in which the wheel 170 is supported on the screw 146 for rotation relative to the screw 146 and is provided with a cam or ramp 180 which coacts with a ramp 182 on buzzer plate 184 to vary the pressure on the plate 184 and thus the volume. The screw is fixed so that the screw head 173 acts as a stop to limit rotation. The wheel 170 is desirably knurled to facilitate manipulation thereof.

In the several embodiments of the invention the adjustment knob limits axial travel or displacement of the plunger or armature plate in the direction of the adjustment member when the coil is energized. By limiting upward travel as adjustment pressure against the springs is increased the kinetic energy or momentum of the movable part is less with the starter stroke and hence the impact of the plunger against the spring 37 and hence the impact of the spring 37 against the bracket 38 is lighter and less noise is produced.

I claim:

1. In an electric buzzer including a bobbin of non-magnetic material having a central sleeve portion with a bore, a plunger reciprocatable in said sleeve portion and having a first plunger end and a second end, an electric coil wound on said bobbin around the sleeve portion, one end of the sleeve portion projecting beyond the end of the coil and including spring means engaging the plunger second end and urging the plunger toward the end of the sleeve, and a bracket of magnetic material at the end of the bobbin opposite the end of the projecting sleeve for mounting the buzzer, the improvement wherein said sleeve portion is open at the projecting end thereof to afford exposure of said first plunger end, said projecting sleeve portion having threads on the outside surface thereof, adjustment means having a threaded bore threadably engaged with said threaded sleeve portion means, and abutment means in said bore of said adjustment means engageable with said plunger first end through said open end of said sleeve portion, said adjustment means being adjustable to change the threaded position of the adjustment means on said sleeve and the position of said abutment means relative to said plunger to vary the travel limit of said plunger in said sleeve during the energization of said buzzer to vary the volume of said buzzer.

2. The improvement of claim 1 wherein said plunger has a head and a recess in the bottom of said sleeve for receiving said headed plunger to retain said plunger in the bobbin.

3. In an electric buzzer including a bobbin of non-magnetic material having a central sleeve portion with a bore, an electric coil wound on said bobbin around the sleeve portion, one end of the sleeve portion projecting beyond the end of the coil and including spring means urging the plunger toward the end of the sleeve portion, and a bracket of magnetic material at the end of the bobbin opposite the end of the projecting sleeve portion for mounting the buzzer, the improvement wherein said sleeve portion is open at the projecting end thereof to afford exposure of said plunger, said projecting sleeve portion having threads on the outside surface thereof, adjustment means having a thread threadably engaged with said outside thread on said sleeve portion means, and abutment means on said adjustment means arranged relative to said plunger such that changing the threaded position of the adjustment means on said sleeve portion varies the travel limit of said plunger in said sleeve portion during the energization of said buzzer to control the volume of said buzzer and wherein said thread on said sleeve portion has longitudinally extending unthreaded flats interrupting the threads to enable disengagement of the threads on said adjustment member and said sleeve portion when a pre-selected level of torque is attained when the adjustment attains its limit of travel so stripping of the threads is avoided.

4. In an electric buzzer including a bobbin of non-magnetic material having a central sleeve portion with a bore, a reciprocable plunger in said bore, an electric coil wound on said bobbin around the sleeve portion, a cylindrical housing surrounding the coil, one end of the sleeve portion projecting beyond the end of the coil and housing and including spring means urging the plunger toward the end of the sleeve portion, and a bracket composed of magnetic material at the end of the bobbin opposite the end of the projecting sleeve portion for mounting the buzzer, the improvement wherein said sleeve portion is open at the projecting end thereof to afford exposure of said plunger, said projecting sleeve portion having an external thread, adjustment means having a bore containing a thread threadably engaged with said threaded sleeve portion means, and abutment means on said adjustment means engageable with the exposed end of said plunger such that changing the threaded position of the adjustment means on said sleeve varies the travel limit of said plunger in said sleeve portion during the energization of said buzzer to control the volume of said buzzer, said adjustment means comprising a generally cylindrical shell castellated to form axially projecting fingers with slots therebetween and engageable concentrically with the cylindrical housing to frictionally grip the housing and retard rotation of said adjustment means.

5. The improvement of claim 4 in which one of said fingers has a greater longitudinal extent than the others, and stop means on the housing engageable with said projecting finger extension to limit rotation of said adjustment means.

6. The improvement of claim 4 in which said fingers have ribs on their inside surface and cooperating detent surfaces on said housing.

7. In an electric vibrator including a bobbin of non-magnetic material and a magnetic armature and a casing having a mounting bracket, the improvement wherein said mounting bracket includes a mounting slot, said mounting slot having a channel entry portion and a compound curved wall at one end thereof and a curved wall with a uniform radius merging with said compound curved portion to form a loop for retaining a mounting screw and whereby said mounting bracket has a lower mounting surface and a saddle-shaped rib protruding therefrom, said rib defining two contact points and a protrusion projecting from said mounting surface at a point remote from said saddle-shaped rib to provide a three point contact of said mounting bracket with a mounting surface.

8. The improvement of claim 7 in which said mounting bracket has a fin portion extending outwardly therefrom to increase the strength thereof and a reinforcing rib generally symmetrically arranged with respect to said fin to increase the strength of said bracket.

9. The improvement of claim 3 in which said sleeve portion is reduced in thickness in the regions of the flats on said threaded sleeve portion and wherein said threaded adjustment means cam and deform the wall of said threaded sleeve portion to release the threaded engagement when the adjustment means reaches the end of the threaded travel on said sleeve portion to avoid stripping of the threads.

10. The improvement of claim 1 wherein said adjustment means is comprised of a cap having a castellated skirt with slots for torquing the cap with a tool.

11. In an electric buzzer having a cylindrical housing with an open end and a vibrating plunger member exposed at the open end, the improvement comprising adjustment means encircling said cylindrical housing and supported on said buzzer for rotation and axially movable adjustment relative to said vibrating plunger member, said adjustment means having a part presented toward said plunger member through said open end, and wherein said adjustment means is tangentially accessible and manipulatable.

12. The improvement of claim 11 including a mounting bracket which has a fin portion extending outwardly therefrom to increase the strength thereof and a reinforcing rib generally symmetrically arranged with respect to said fin to increase the strength of said bracket.

13. The improvement of claim 11 wherein said adjustment means is supported for threaded rotation by a screw fixed to said buzzer and said screw having a head providing a stop to limit movement.

14. The improvement of claim 11 wherein said adjustment means has a skirt which frictionally engages said cylindrical housing to prevent self-rotation.

15. The improvement of claim 11 wherein said adjustment means has a castellated skirt with slots for manipulation.

16. The improvement according to any one of claims 1 or 11 wherein said adjustment means has a skirt with inwardly protruding ribs and recesses in said housing which coact with said ribs to restrain movement of said adjustment means relative to said housing.

17. The improvement of claim 11 wherein the diameter of the adjustment means is at least as large as said cylindrical housing.

18. The improvement of claim 11 in combination with a telephone housing having a frontal access slot for tangential access to said buzzer adjustment wheel.

* * * * *